(12) United States Patent
Yasuda

(10) Patent No.: US 6,499,561 B1
(45) Date of Patent: Dec. 31, 2002

(54) MUFFLER FOR ALL TERRAIN VEHICLE

(75) Inventor: Kazuhiro Yasuda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 44 days.

(21) Appl. No.: 09/691,215

(22) Filed: Oct. 19, 2000

(30) Foreign Application Priority Data

Oct. 19, 1999 (JP) ............................................. 11-297387

(51) Int. Cl.⁷ ................................................. F01N 7/08
(52) U.S. Cl. ........................ 181/227; 181/272; 181/282
(58) Field of Search ............................... 181/255, 227, 181/228, 249, 269, 272, 282

(56) References Cited

U.S. PATENT DOCUMENTS

| | | | | |
|---|---|---|---|---|
| 3,159,239 A | * | 12/1964 | Andrews | 181/282 |
| 4,011,922 A | * | 3/1977 | Goplen | 181/272 |
| 5,627,351 A | * | 5/1997 | Okuma et al. | 181/228 |
| 5,670,756 A | * | 9/1997 | Ohtaka et al. | 181/256 |
| 5,708,238 A | * | 1/1998 | Asao et al. | 181/265 |
| 5,718,045 A | * | 2/1998 | Tsukahara et al. | 181/228 |
| 5,969,299 A | * | 10/1999 | Yamaguchi et al. | 181/227 |
| 6,070,695 A | * | 6/2000 | Ohtaka et al. | 181/228 |

FOREIGN PATENT DOCUMENTS

| | | | | |
|---|---|---|---|---|
| JP | 61212623 A | * | 9/1986 | F01N/7/18 |
| JP | 04303107 A | * | 10/1992 | F01N/3/20 |
| JP | A835416 | | 2/1996 | |
| JP | 10266828 A | * | 10/1998 | F01N/3/06 |

* cited by examiner

Primary Examiner—Khanh Dang
(74) Attorney, Agent, or Firm—Birch, Stewart, Kolasch & Birch, LLP.

(57) ABSTRACT

A rear end surface of a muffler is inclined so as to extend in parallel to the ground (E) when an all terrain vehicle is leaned against a support with rear ends of a rear carrier and rear portions of two rear wheels in contact with the ground (E) for storage. The volume of the expansion chamber of the muffler can be easily increased without making the muffler touch the ground when the all terrain vehicle is leaned against a support and without requiring large-scale modification. Thus, the silencing ability of the muffler of the all terrain vehicle can be improved.

8 Claims, 5 Drawing Sheets

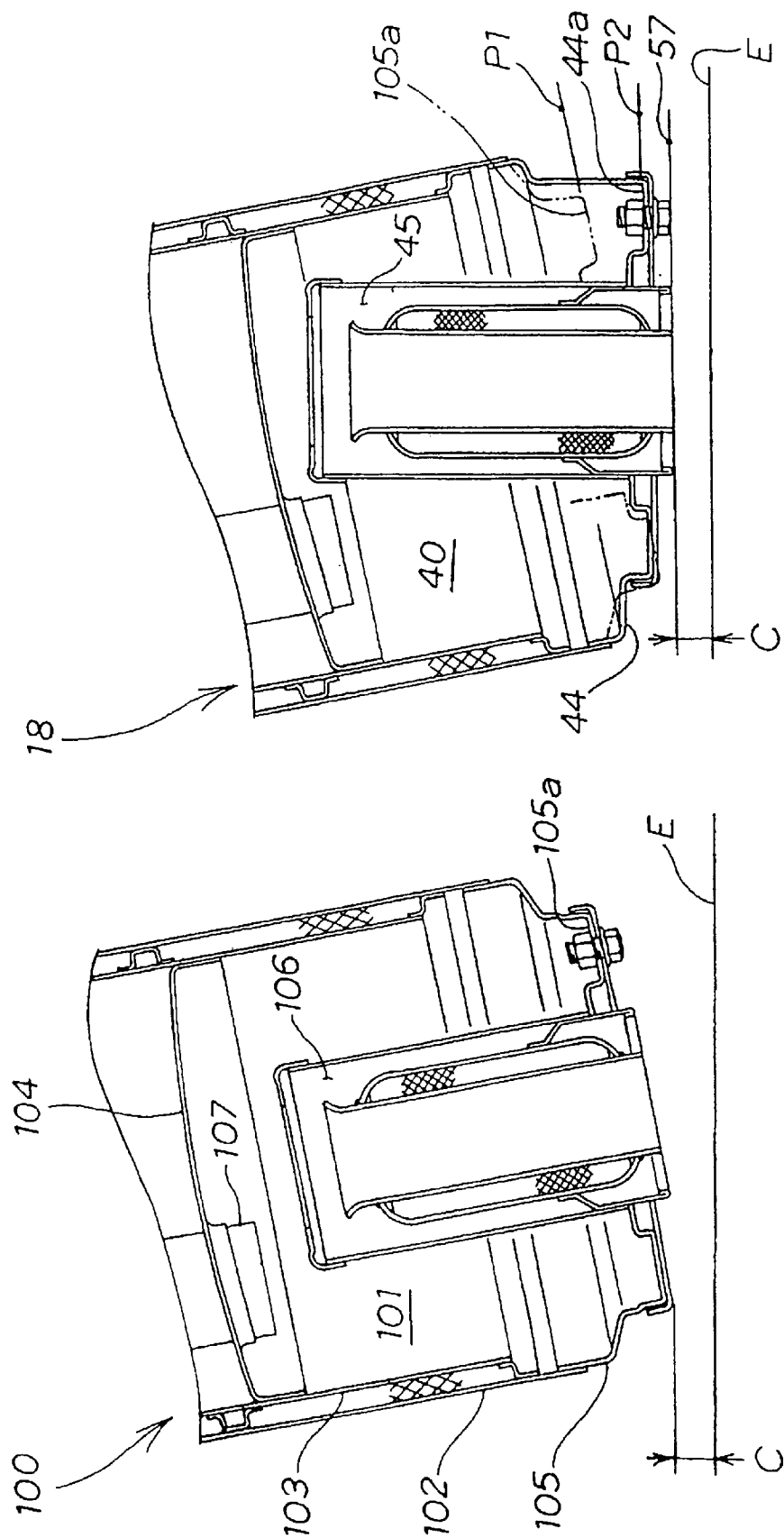

MUFFLER FOR ALL TERRAIN VEHICLE

BACKGROUND OF THE INVENTION

1. Field of the Invention

The present invention relates to a muffler suitable for an all terrain vehicle which is leaned against a support with its rear portion in contact with the ground for storage.

2. Description of Background Art

A known muffler for an all terrain vehicle is disclosed in, for example, JP-A No. H8-35416 for "Exhaust Muffler". In a saddle type vehicle shown in FIG. 1 of drawings appended to the specification for JP-A No. H8-35416, rear wheels WR are suspended from a rear portion of a body frame B, a rear carrier is supported on the rear portion of the body frame B. An exhaust pipe 8 extends from an engine E and an exhaust muffler 9 is connected to a rear end portion of the exhaust pipe 8.

Generally, an all terrain vehicle, such as the prior art saddle type vehicle, is leaned against a support with its rear end in contact with the ground for storage. When it is desired to provide the exhaust muffler 9 with a high silencing ability, the exhaust muffler 9 must have an expansion chamber of a large volume. Consequently, the exhaust muffler 9 must be formed to have a large outside diameter or a long length. If the exhaust muffler 9 is formed to have a long length and the length extends rearwardly, the rear end of the exhaust muffler 9 will engage the ground when leaning the vehicle against a support and the vehicle cannot be leaned against the support.

Therefore, the vehicle requires a large-scale modification including an an extension of the carrier rearwardly or displacing the rear wheels rearwardly in order that the exhaust muffler 9 may extend rearwardly beyond the rear carrier or the rear wheels WR.

SUMMARY AND OBJECTS OF THE INVENTION

Accordingly, it is an object of the present invention to provide a muffler for an all terrain vehicle which may be leaned against a support with its rear portion in contact with the ground for storage and having an expansion for the muffler that can be easily modified to increase its volume.

According to a first aspect, a muffler is provided for an all terrain vehicle. The all terrain vehicle includes a body, an engine, a carrier supported on a rear portion of the body and rear wheels. The muffler extends rearwardly from an exhaust pipe connected to the engine and includes a rear end surface of the muffler that is parallel to the surface of the ground when the all terrain vehicle is leaned against a support with a rear end of the carrier and rear portions of the two rear wheels in contact with the surface of the ground.

When the all terrain vehicle is leaned against a support for storage, the rear end surface of the muffler is in parallel to the surface of the ground and the rear end of the carrier and the rear portions of the two rear wheels are in contact with the ground.

When leaning the all terrain vehicle against the support, the muffler does not touch the ground, the muffler does not need to be modified in a large scale and the volume of the expansion chamber of the muffler can be easily increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(a) and 5(b) are fragmentary sectional views comparatively showing a prior art muffler and the muffler embodying the present invention, respectively.

DETAILED DESCRIPTION OF THE PREFERRED EMBODIMENTS

Figure 1:
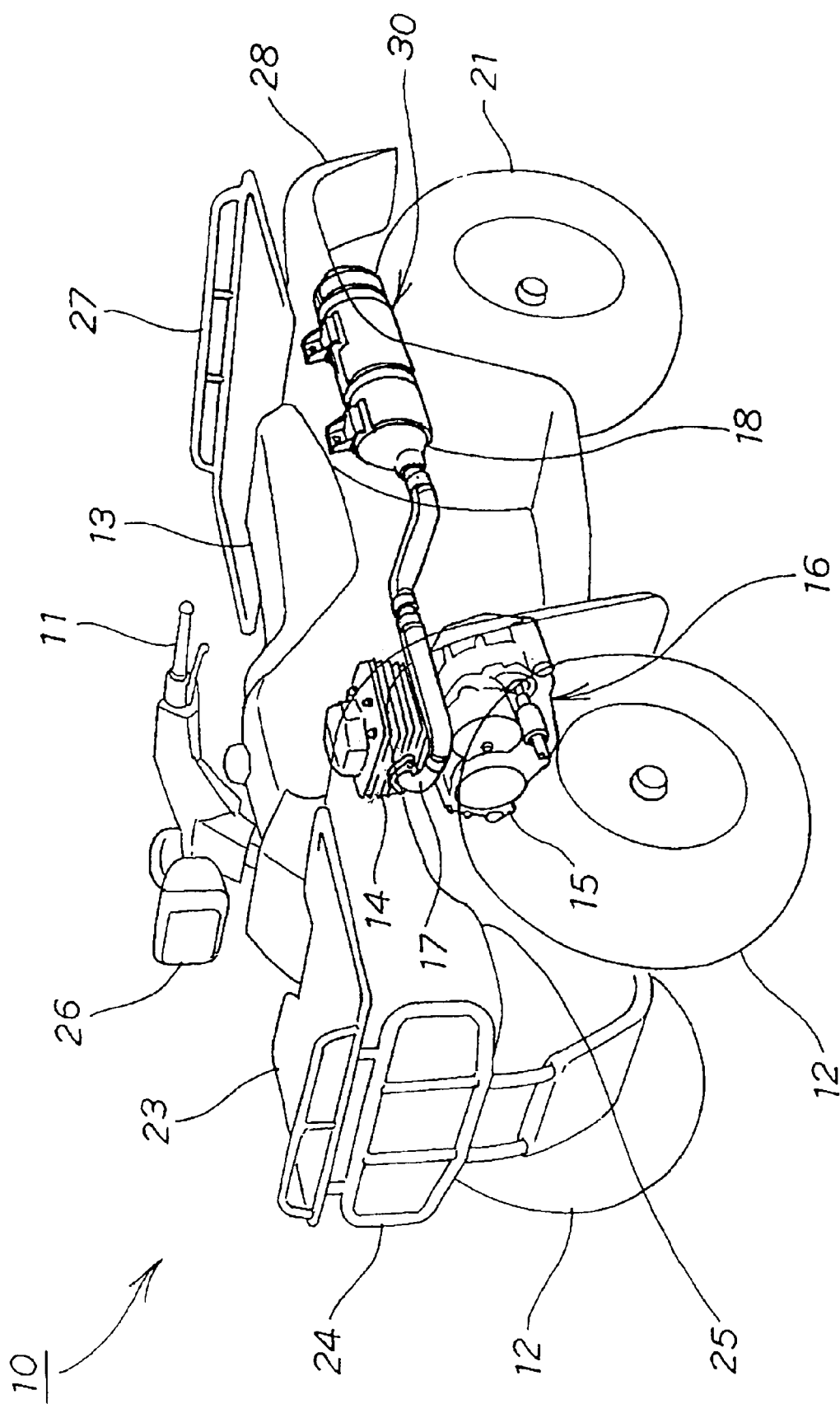
FIG. 1 is a perspective view of an all terrain vehicle provided with a muffler in a preferred embodiment according to the present invention.

A preferred embodiment of the present invention will be described with reference to the accompanying drawings. FIG. 1 is a perspective view of an all terrain vehicle provided with a muffler in a preferred embodiment according to the present invention.

An all terrain vehicle (ATV) 10 has a handlebar 11 supported for turning on a body frame, not shown. Front wheels 12 are suspended for vertical movement by arms, not shown, from the body frame and connected to the handlebar 11 by a steering mechanism, not shown. A seat 13 is mounted on the body frame. A power unit 16 includes an engine 14 and a transmission 15 and is disposed under the seat 13. An exhaust pipe 17, having one end connected to a front portion of the engine 14, extends earwardly A muffler 18 is connected to a rear portion of the exhaust pipe 17. Rear wheels 21 (only one of the rear wheels 21 is shown) are connected to the rear portion of the all terrain vehicle. The front wheels 12 and the rear wheels 21 are driven through a power transmitting mechanism, not shown, by the power unit 16. As shown also in FIG. 1, a front carrier 23, a front bumper 24, a front fender 25, a headlamp 26, a rear carrier 27 and a rear fender 28 form various portions of the all terrain vehicle.

The exhaust pipe 7 and the muffler 18 constitute an exhaust system 30.

The all terrain vehicle 10 is an off-road vehicle, such as a buggy, having a lightweight, compact body, having a tight turning circle, capable of being easily controlled and suitable for agricultural purposes, farming purposes, hunting purposes, patrol purposes and recreational purposes.

Figure 2:
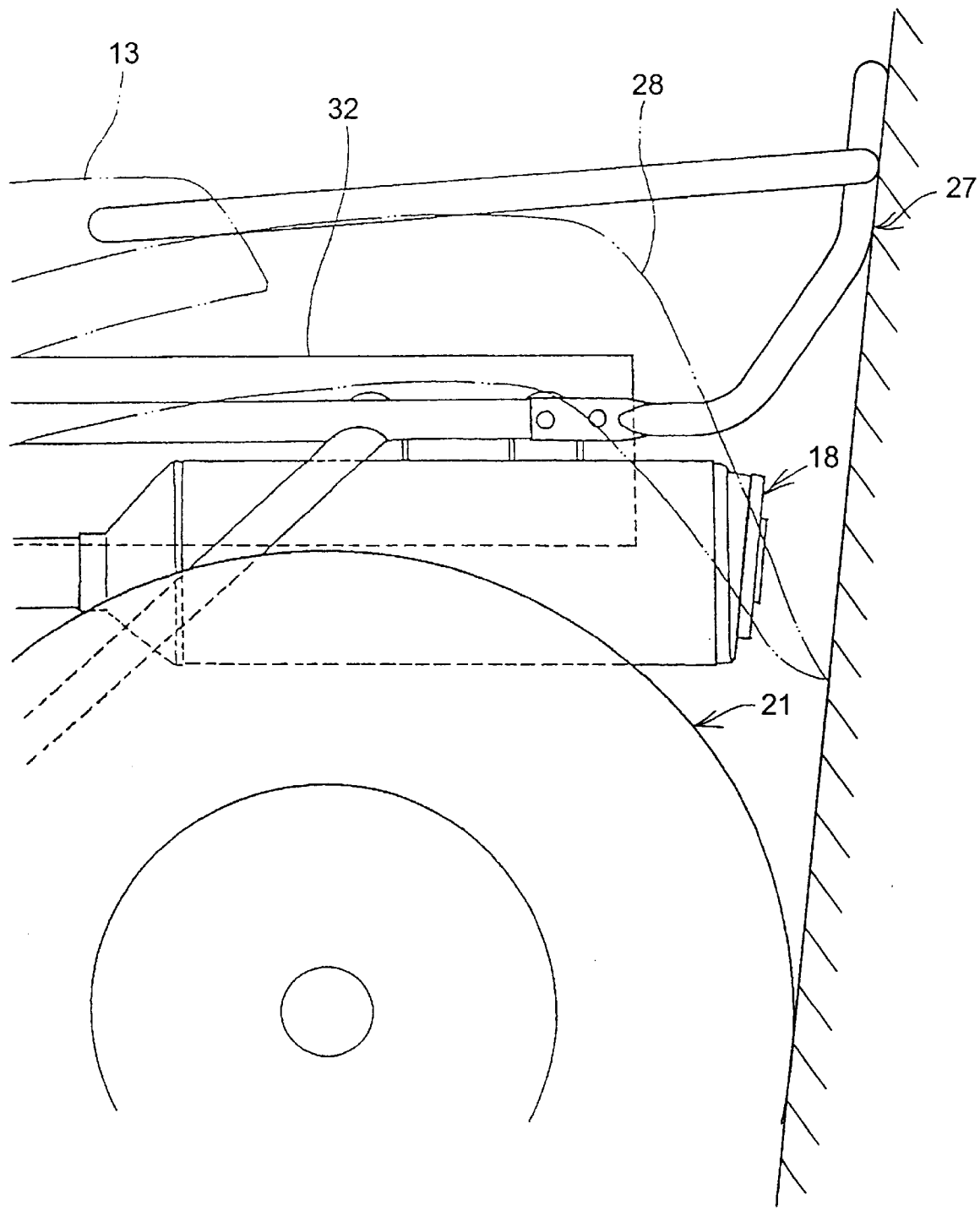
FIG. 2 is a side elevational view of a rear portion of the all terrain vehicle provided with the muffler embodying the present invention.

FIG. 2 is a side elevation of a rear portion of the all terrain vehicle provided with the muffler embodying the present invention. The rear carrier 27 is attached to a rear portion of the body frame 32, the rear wheels 21 (only one of the rear wheels 21 is shown) is disposed under the body frame 32, and the muffler 18 is disposed with its rear end located between the rear end of the rear carrier 27 and rear portions of the rear wheels 21.

Figure 3:
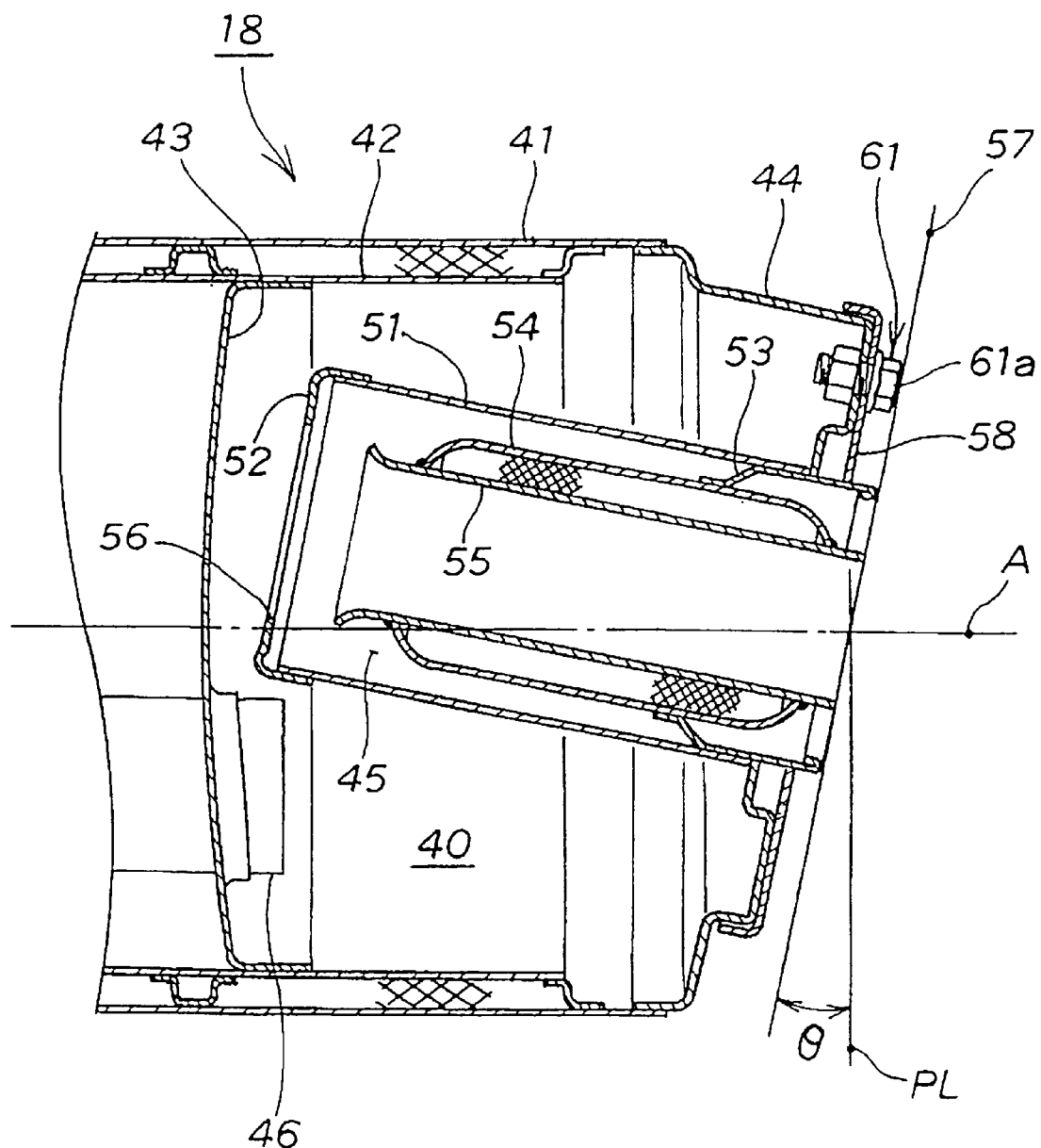
FIG. 3 is a sectional view of the muffler embodying the present invention.

FIG. 3 is a sectional view of the muffler embodying the present invention. A rear expansion chamber 40 that is connected to a front expansion chamber is formed in a rear end portion of the muffler 18.

The rear expansion chamber 40 is defined by an inner pipe 42 disposed in an outer tube 41. A partition wall 43 is disposed in the inner tube 42. A cover 44 is provided for covering the rear open end of the outer tube 41. An outer wall is provided for forming an auxiliary expansion chamber 45 and projecting inward from the cover 44.

A connecting pipe 46 for communicating with the front expansion chamber is attached to the partition wall 43.

The auxiliary expansion chamber 45 is defined by the outer tube 51, a front cover 52 covering an inner end of the outer tube 51, and a rear partition wall 53 connected to a rear end portion of the outer tube 51. An inner tube 54 is placed in the auxiliary expansion chamber 45 and attached to the rear partition wall 53. A rear connecting pipe 55 is disposed in the inner tube 54 so as to open outside.

The rear expansion chamber 40 and the auxiliary expansion chamber 45 communicate with each other by means of an opening 56.

A rear end surface 57 is in a plane including the rear end of the rear partition wall 53 and the rear end of the rear connecting pipe 55. The rear end surface 57 is inclined at an angle to a plane PL perpendicular to the longitudinal axis A of the muffler 18.

The rear partition wall 53, the inner tube 54 and the rear connecting pipe 55 are attached to a rear plate 58 having a bent peripheral portion. The rear plate 58 is fastened to the cover 44 with bolts 61 to hold the rear partition wall 53, the inner tube 54 and the rear connecting pipe 55 in the outer tube 51.

The end surfaces of the heads 61a of the bolts 61 fastening the rear plate 58 to the cover 44 are flush with the rear end surface 57 or on the front side of the rear end surface 57.

Figure 4:
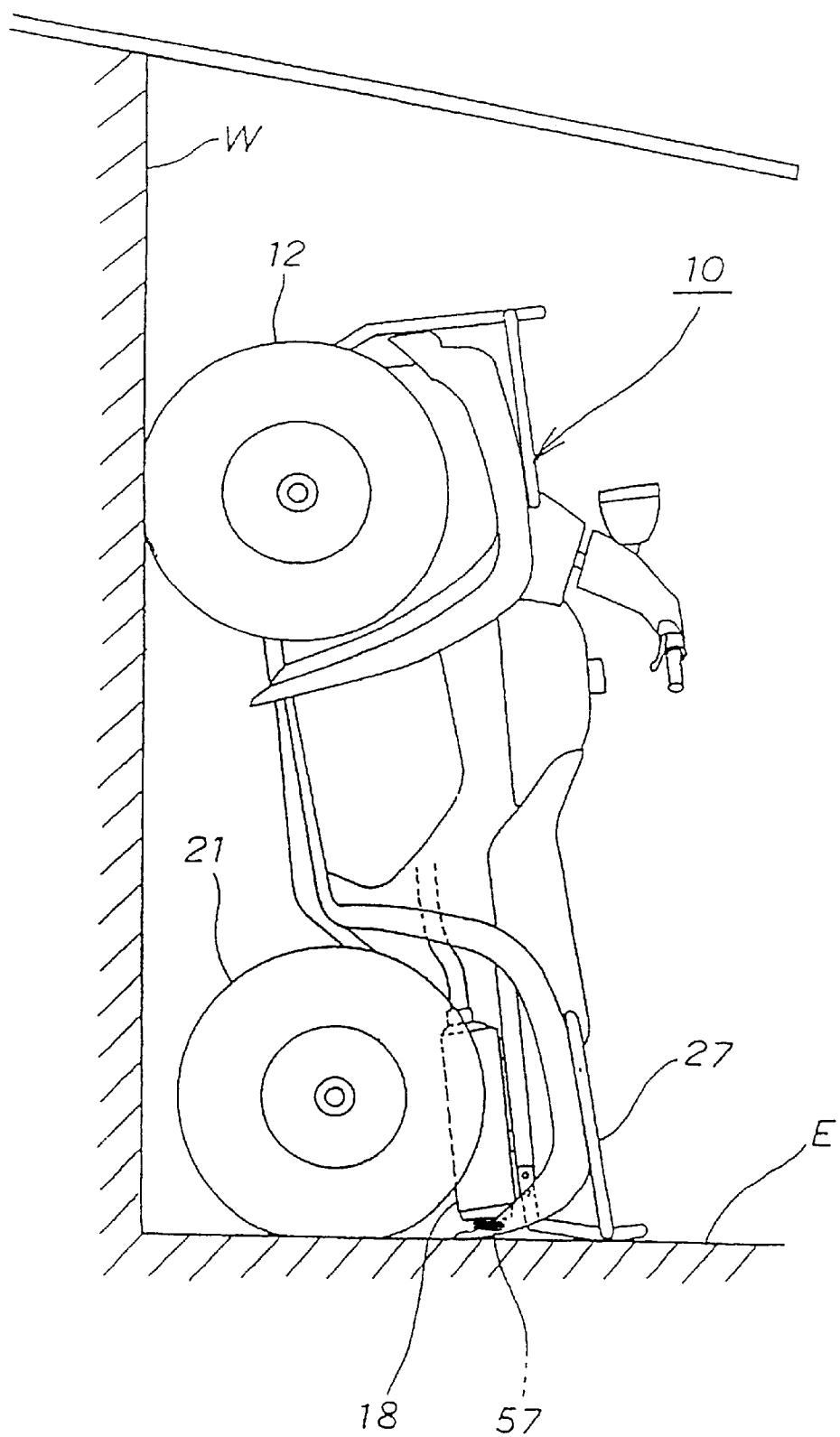
FIG. 4 is a side elevational view of the all terrain vehicle provided with the muffler embodying the present invention leaned against a wall.

FIG. 4 is a side elevation of the all terrain vehicle 10 provided with the muffler 18 embodying the present invention leaned against a wall W with the rear end of the rear carrier 27 and rear portions of the two rear wheels 21 (only one of the rear wheels 21 is shown) in contact with the ground E for storage in a garage or under an eave of a building.

In this state, the rear end surface 57 of the muffler 18 is spaced slightly from the ground E. The front wheels 12 (only one of the front wheels 12 is shown) may rest on the wall W.

The shapes of the respective rear end portions of the muffler 18 and a muffler 100 in a comparative example will be compared. FIG. 5(a) shows a rear end portion of the muffler 100 in a comparative example and FIG. 5(b) shows a rear end portion of the muffler 18 in the preferred embodiment.

The muffler 100 in a comparative example shown in FIG. 5(a) is provided in its rear end portion with an expansion chamber 101 communicating with a front expansion chamber. The expansion chamber 101 is defined by an inner tube 103 disposed in an outer tube 102, a partition wall 104 placed in the inner tube 103, a cover 105 covering an open rear end of the outer tube 102, and an outer wall defining an auxiliary expansion chamber 106.

A connecting pipe 107 connected to the front expansion chamber is attached to the partition wall 104. As an example, the least clearance between the ground E and the muffler 100 is C when an all terrain vehicle 10 similar to that shown in FIG. 4 is leaned on the wall W as shown in FIG. 4.

When the all terrain vehicle 10 provided with the muffler 18 is leaned against the wall W, the rear end surface 57 of the muffler 18 is parallel to the surface of the ground E as shown in FIG. 5(b).

As illustrated in FIG. 5(b), the least necessary clearance between the ground E and the muffler 18 is C when the all terrain vehicle is leaned against the wall. In FIG. 5(b), an inclined line P1 indicates the inner surface 105a of the cover 105 defining the rear end of the expansion chamber 101 of the muffler 100 as compared to the comparative example.

A line P2 indicates the inner surface 44a of the cover 44 of the muffler 18 in the preferred embodiment. The line P2 is closer to the ground than the line P1, which signifies that the volume of all the expansion chambers of the muffler 18 including the rear expansion chamber 40 is greater than that of all the expansion chambers of the muffler 100 in a comparative example shown in FIG. 5(a) including the expansion chamber 101.

As mentioned above, in the all terrain vehicle 10 formed by mounting the engine 14, the rear carrier 27 and the right and the left rear wheel 21 (only one of the rear wheels 21 is shown) shown in FIG. 1 on the body frame 32 (FIG. 2), extending the exhaust pipe 17 from the engine 14 and extending the muffler 18 rearwardly from the exhaust pipe 17, the rear end surface 57 of the muffler 18 is inclined so that the rear end surface 57 of the muffler extends in parallel to the surface of the ground E when the all terrain vehicle 10 is leaned against a support with the rear end of the rear carrier 27 and the rear portions of the two rear wheels 21 in contact with the ground E.

Thus, the volume of the expansion chamber of the muffler 18 can be easily increased without making the muffler 18 touch the ground E when the all terrain vehicle 10 is leaned against a support and without requiring large-scale modification.

Thus, the silencing ability of the muffler 18 of the all terrain vehicle 10 can be improved.

The muffler according to the present invention is applicable to an all terrain vehicle having a single rear wheel if the all terrain vehicle leaned against a support is prevented from falling down by providing the same with a rear carrier having a rear end of a predetermined width that is set in contact with the ground when the all terrain vehicle is leaned against a support or with a auxiliary device capable of preventing the all terrain vehicle leaned against a support from falling down.

The present invention exercises the following effects. The muffler according to the first aspect has a rear end surface that extends in parallel to the surface of the ground when the all terrain vehicle is leaned against a support with the rear end of the carrier and the rear portions of the two rear wheels in contact with the ground. Therefore, the volume of the expansion chamber of the muffler can be easily increased without making the muffler touch the ground when the all terrain vehicle is leaned against a support and without requiring large-scale modification.

Thus, the silencing ability of the muffler of the all terrain vehicle can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A muffler for an all terrain vehicle having a body, an engine, a carrier supported on a rear portion of the body and rear wheels, extended rearwardly from an exhaust pipe connected to the engine comprising:

a rear end surface of the muffler is parallel to the surface of the ground when the all terrain vehicle is leaned against a support with a rear end of the carrier and rear portions of the two rear wheels in contact with the ground, said rear end surface being inclined at an angle to a plane perpendicular to a longitudinal axis of the muffler; and an auxiliary expansion chamber having a straight cylindrical shape projecting inwardly from and perpendicular to said rear end surface of said muffler and at an angle relative to the longitudinal axis of muffler, permitting a front end of the auxiliary expansion chamber to be positioned side by side to a rear end of a first connecting pipe in a rear expansion chamber, the auxiliary expansion chamber being contained entirely within said rear expansion chamber.

2. The muffler according to claim 1, wherein said muffler includes at least a front expansion chamber and said rear expansion chamber, said rear expansion chamber being formed by an outer tube of said muffler and said rear end surface, said rear end surface being secured to an outer wall of said muffler at an angle for increasing the internal size of said rear expansion chamber.

3. The muffler according to claim 1, wherein said muffler includes an outer tube having an end surface with a cover being secured to said end surface thereof, said cover being elongated along a predetermined distance of an portion of said cover and said rear end of said muffler being secured to said cover for forming an enlarged expansion chamber within said muffler.

4. The muffler according to claim 3, and further including an inner tube being disposed adjacent to said outer tube, said inner tube forming an interior wall for a portion of said enlarged expansion chamber.

5. The muffler according to claim 2, wherein said first connecting pipe is provided for communicating exhaust gases from said front expansion chamber to said rear expansion chamber, and a second connecting pipe is provided for communicating exhaust gases from said rear expansion chamber to the atmosphere.

6. A muffler for an all terrain vehicle comprising:

an outer tube having a front end and a rear end, said rear end being an opened end;

an inner tube disposed within said outer tube and being spaced a predetermined distance therefrom;

a cover being secured to said opened end of said outer tube, said cover having a first predetermined portion that extends a first predetermined distance from said opened end of said rear end of said outer tube, a second predetermined portion that extends a second predetermined distance from said opened end of said rear end, an outer wall and a rear plate secured to said outer wall, the outer wall and the plate each having a plane inclined at an angle perpendicular to a longitudinal axis of the muffler for forming an enlarged rear expansion chamber within said muffler, wherein:

said rear plate of the cover is parallel to the surface of the ground when the all terrain vehicle is leaned against a support with a rear end of the carrier and rear portions of rear wheels being in contact with the ground, and an auxiliary expansion chamber having a straight cylindrical shape projects inward from the outer wall of the cover, and a front end of the auxiliary expansion chamber to be positioned side by side to a rear end of a first connecting pipe in the rear expansion chamber, the auxiliary expansion chamber being contained entirely within said rear expansion chamber.

7. The muffler according to claim 6, wherein said muffler includes at least a front expansion chamber and said rear expansion chamber, said rear expansion chamber being formed by said inner tube of said muffler and said rear plate, said rear plate being secured to said cover of said muffler at an angle for increasing the internal size of said rear expansion chamber.

8. The muffler according to claim 7, wherein said first connecting pipe is provided for communicating exhaust gases from said front expansion chamber to said rear expansion chamber and a second connecting pipe is provided for communicating exhaust gases from said rear expansion chamber to the atmosphere.

* * * * *